United States Patent
Nagy et al.

(10) Patent No.: US 10,247,562 B2
(45) Date of Patent: Apr. 2, 2019

(54) METHOD FOR DISPLAYING REAL RANGE OF ELECTRIC VEHICLES ON A MAP

(71) Applicant: GPS TUNER KFT., Budapest (HU)

(72) Inventors: Tamas Nagy, Debrecen (HU); Gabor Tarnok, Budakalasz (HU); Jozsef Horvath, Csurgo (HU)

(73) Assignee: GPS TUNER SYSTEMS KORLATOLT FELELOSSEGU TARSASAG, Budapest (HU)

( * ) Notice: Subject to any disclaimer, the term of this patent is extended or adjusted under 35 U.S.C. 154(b) by 0 days.

(21) Appl. No.: 14/914,632

(22) PCT Filed: Aug. 7, 2014

(86) PCT No.: PCT/HU2014/000066
§ 371 (c)(1),
(2) Date: Feb. 25, 2016

(87) PCT Pub. No.: WO2015/022557
PCT Pub. Date: Feb. 19, 2015

(65) Prior Publication Data
US 2016/0209227 A1    Jul. 21, 2016

(30) Foreign Application Priority Data

Aug. 15, 2013 (HU) .................................... 1300489

(51) Int. Cl.
*G01C 21/34* (2006.01)
*B60L 11/18* (2006.01)
(Continued)

(52) U.S. Cl.
CPC .......... *G01C 21/3469* (2013.01); *B60K 35/00* (2013.01); *B60L 11/18* (2013.01);
(Continued)

(58) Field of Classification Search
CPC combination set(s) only.
See application file for complete search history.

(56) References Cited

U.S. PATENT DOCUMENTS 8,332,151 B2 * 12/2012 Suganuma ............ B60W 40/06
702/102
8,972,161 B1 * 3/2015 Koebler ............ G01C 21/3469
340/995.27

(Continued)

*Primary Examiner* — Adam D Tissot
*Assistant Examiner* — Edward J Pipala
(74) *Attorney, Agent, or Firm* — Anthony H. Handal; Handal & Morofsky (57) ABSTRACT

Method for displaying the actual range of an electric vehicle from a starting point shown on a map, in the course of which based on the given parameters of the vehicle it is determined that on a horizontal surface for a covering a certain distance how much electric consumption is necessary, how much the maximum consumption can be, it is also determined that with respect to roads with different steepness to what extent (correction factors) the actual consumption varies from the consumption on a horizontal surface, then the map data is input into the map database with respect to a hypothetical range from the starting point and from the starting point the set of discrete peak points on the map is indicated, where the steepness of the surface between two neighboring peak points is considered steady, then the costs of the various available routes are determined from the starting point with Dijkstra algorithm and using a successive iteration, where the cost between two peak points mean the value modified by the correction factor related to the given steepness of the consumption measured on a horizontal surface, then with respect to those peak points where the costs reach the determined maximum consumption, it is specified as the points indicating the real range, and the location of such points are displayed on the map.

15 Claims, 6 Drawing Sheets

(51) Int. Cl.
*G01C 21/36* (2006.01)
*B60K 35/00* (2006.01)
(52) U.S. Cl.
CPC ...... *B60L 11/1862* (2013.01); *G01C 21/3676* (2013.01); *B60K 2350/1092* (2013.01)

(56) References Cited

U.S. PATENT DOCUMENTS

| | | | |
|---|---|---|---|
| 2011/0184642 A1* | 7/2011 | Rotz | G01C 21/3469 701/533 |
| 2011/0307166 A1* | 12/2011 | Hiestermann | G01C 21/32 701/119 |
| 2011/0313647 A1* | 12/2011 | Koebler | B60L 15/2045 701/123 |
| 2013/0096818 A1* | 4/2013 | Vicharelli | G01C 21/3469 701/423 |
| 2013/0151046 A1* | 6/2013 | Choi | G08G 1/096827 701/22 |
| 2013/0325310 A1* | 12/2013 | Lange | G01C 21/3697 701/123 |
| 2014/0019041 A1* | 1/2014 | Kluge | G01C 21/3469 701/430 |
| 2014/0172285 A1* | 6/2014 | Kuhn | B60L 11/1861 701/123 |

* cited by examiner

METHOD FOR DISPLAYING REAL RANGE OF ELECTRIC VEHICLES ON A MAP

CROSS REFERENCE TO RELATED APPLICATIONS

This application is a National Stage Entry of PCT/HU2014/0000066 filed on August, 2014, which claims priority to Hungarian patent application P1300489, filed Aug. 15, 2013, the disclosures of which are incorporated herein by reference.

TECHNICAL FIELD

The invention relates to a method for displaying the real range of an electric vehicle on a map from a given point.

STATEMENT REGARDING FEDERALLY SPONSORED RESEARCH OR DEVELOPMENT (Not applicable)

BACKGROUND OF THE INVENTION

In this context an electric vehicle means a vehicle, which gains wholly or partially (determined in percentages) the energy necessary for its operation from stored electric energy of a storing device, primarily, the battery that has a given capacity. With respect to bicycles supplemented with electric drive (e-bikes) and man-operated vehicles (for example three-wheel vehicles, recumbent vehicles or tandem bicycles) it can be preset what portion of the energy necessary for the operation of the vehicle the driver intends to cover from its own energy or from the electric drive.

Such electric vehicles, due to the limits of finite energy storage capacity, have a given and known (or calculable) range on a horizontal surface. The range is usually determined as a horizontal distance which can be covered by a fully charged vehicle until the battery goes flat. This distance obviously depends on the weight of the given vehicle, the sort of operation (man-power or electric) and the load arising from the weight of the driver and/or the passengers. As the dependency from the above parameters is fairly well calculable, when determining the range these parameters should be stored into a device making the calculation. Also, it should be stored into the device in advance as a parameter whether the given user would like to know (i) the maximum range of the fully charged battery or the half range (if such user goes from a starting point to a target point and then would like to return to the starting point); or (ii) the range related to the use of any predetermined part of the capacity of the battery.

The variables determined herein are parameters, which can be set by the user as he or she wishes, and from such information the range related to the given parameters on a horizontal surface can be easily determined.

However, in reality there is no ideal horizontal road, as the roads follow the landscape, there are uphills and slopes. Certain electric vehicles are capable of regenerating the energy owing to the recharging effect when the vehicle is using its brakes. On the other hand, going uphill, depending on the angle of the uphill, requires more energy than travelling on a horizontal road.

In the context of this invention real range means the actual range, considering, among others, the landscape, which can be covered by the vehicle based on the set parameters and by using a predetermined portion of the battery capacity. Obviously, the real range strongly depends on the landscape, therefore, the real range will mean the various distances from a circle drawn around the starting point that shows the theoretical range.

There are certain computerized devices for determining the real range on a given road, primarily simulator programs, which calculate the real range following the input of the information of the vehicle, the load and the inclination of the road determined in a percentage. Such simulator is not capable of determining the real range applicable to the given road, but it takes into consideration the ascent.

Another simulation method already uses the route finder function provided by the Google Maps applications and connects this with another known database containing the landscape data as well; this method is capable of determining the real range with respect to a given road or finding charging stations within the range.

In U.S. Pat. No. 8,332,151 B2 a method and a system are introduced for (i) determining a gradient in a field and based on that (ii) for the navigation of the vehicle, which requires the knowledge of correct status and altitude information of the vehicle; and such data are considered together with a pre-stored known field database. The primary purpose of this system is to determine the correct navigation and the gradient and it does not deal with the questions related to the determination of the real range.

SUMMARY OF THE INVENTION

The object of the invention is to provide a method for displaying the real range of a vehicle with given parameters considering a number of optional routes with respect to a point shown on the given map. This informs the driver about which route to take and about the distance he or she can cover with the vehicle, based on which the driver can easily decide the best route to take in order to reach the target point. For the determination of the real range there is no predetermined set route or target, as any of the routes from the given point should be taken into consideration.

A further objective of the invention is to provide a method that can be carried out by using an intelligent mobile device with appropriate processor capacity that there is no need for using a remote server or database, i.e. the mobile device can use the application software stored therein to display the actual range.

For reaching said objects a method has been provided for displaying the actual range of a vehicle with electric drive on a map counted from a starting point, that comprises the steps of determining the electrical consumption associated with taking a unity distance along a horizontal road section based on predetermined parameters of the vehicle; and storing the maximum consumption that defines the actual range, wherein according to the invention the following steps are carried out: storing in a database by what coefficients the actual consumption differs on road sections with is differing steepness from the consumption measured along a horizontal road of the same length; storing map data corresponding to an estimated range around the starting point; assigning a plurality of discrete peak points on the map around the starting point, wherein the steepness of the landscape is constant between two neighboring one of said peaks; then beginning from said starting point determining the cost of any possible route by using a successive iteration and the Dijkstra algorithm, wherein the cost along a road section between two neighboring peaks is given by the consumption measured on a horizontal road with the same length as modified by the coefficient corresponding to the steepness of said road section; then storing the peak points where the value of the associated cost reaches said maximum consumption as points of the actual range, and displaying these points on the map.

In a preferred embodiment during the repeated examinations storing the coordinate data and the associated cost in a temporary database referred to as the set of examined peaks; and in the subsequent cycle examining the previously non-examined peak points which are ends of edges starting from the examined peak points and determining the costs associated with these peak points; and if a peak is associated with different costs, then storing the smallest one of such costs in said temporary database of the set of examined peaks.

The cost associated with a peak point is the sum of the modified cost of the edge ending at said peak point and of the cost of the peak point where said edge starts.

The required processing capacity can be decreased to a substantial extent if for the processing of the respective cycles only the data of the peak points obtained at the end of the immediately previous cycle and of those peak points which are located at the ends of the edges starting from said previous peak points are read from the map database and used.

It is a comfortable convention if the peak points and the edges are characteristic parts of the roads that can be taken by the vehicle and being on said map.

In a preferable embodiment when the vehicle can move along a land without built roads, and said peak points and edges are represented by corners and edges of a net that includes said starting point and has edges of predetermined length, and the cost of the peak points of the net are determined beginning from said starting point, and when such a cost reaches the maximum consumption, then the associated peak is indicated on the map as a boundary point.

In this case it is further preferred when the boundary points are interconnected and the so obtained closed configuration is shown on the map.

When on the given land there are also built roads that can be driven by vehicles, then within said configuration said roads and their associated range points are also indicated on the map.

The vehicle is preferable one driven also with human power such as bicycles, trikes or similar machines.

The use of the method is especially useful if the vehicle can move on land without built roads such are e.g. mountain bikes.

For the sake of better visualization the routes than can be reached within the actual range are shown in a distinctive way.

BRIEF DESCRIPTION OF THE DRAWINGS

The method according to the invention will now be described in connection with preferable embodiments thereof, wherein reference will be made to the accompanying drawings. In the drawing:

FIGS. 5 *a-d* show the phase sketches of the various steps of the method;

DETAILED DESCRIPTION OF THE INVENTION

For the determination of the actual range the calculations are started from known quantities as parameters, i.e., the capacity of the battery of the electric vehicle is known and it is also known what extent such capacity is allowed to be used, furthermore, the load of the vehicle is known and we also know what battery capacity is consumed battery under these parameters by the vehicle to take one kilometer on a horizontal surface, and finally the actual charging status of the battery is also known. Based on the above data the distance which can be covered by the vehicle on a horizontal surface can be calculated as follows:

$$Mt = Apk/Fk$$

where $Mt$=the distance that can be covered in kilometers
$Apk$=the current capacity of the battery in mAh
$Fk$=average consumption for one kilometer in mAh It is also possible that in the course of the calculation we do not wish to make the calculation for the whole capacity of the battery, but only for a certain part thereof. In such cases the Apk parameter should also be set.

It is also possible that in the case of certain electric bicycles the user pre-sets the extent of the supplementary electric power. In such a case, the calculation should be made with the average consumption Fk characteristic to the preset percentage value of the supplementary electric drive.

Figure 1:
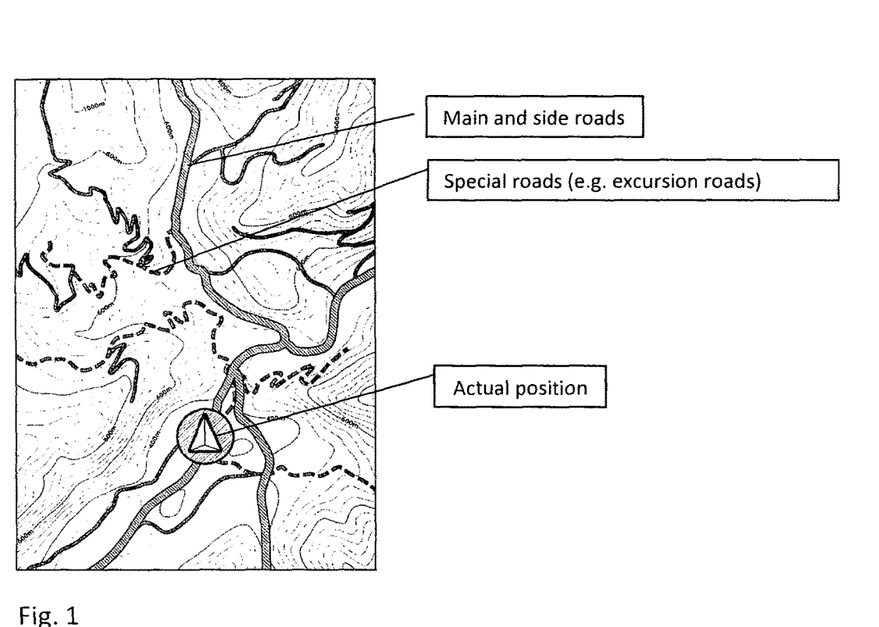
FIG. 1 is a draft map showing the starting point and the roads.

Before introducing further the various steps of the method in detail, in order to be correctly aware of the task, reference is made to FIG. 1. This drawing includes a partial map indicating the starting point, around which we would like to determine the actual ranges. From a practical point of view, the map is in a scale which is capable of showing the actual ranges. The data of FIG. 1 are available in digital form in a map database. Such data include the two coordinates of the given points as well as their latitudinal coordinates. On the map the bold lines indicate the built roads (i.e., main and side roads) and the dashed lines indicate the roads which cannot be used by motor-vehicles, but can be used by, for example, bicycles, which can either be tourist roads or other roads which do not qualify as public roads. In addition, FIG. 1 also indicates the landscape of the surface with the ordinary contour lines.

Figure 2:
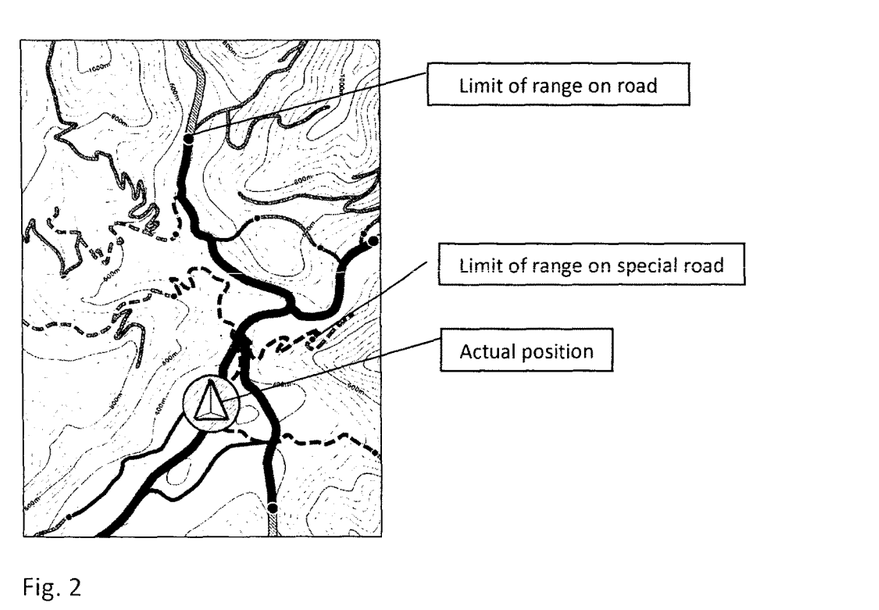
FIG. 2 shows a map similar to the one indicated in FIG. 1, which also shows the real range on the roads.

FIG. 2 shows the same map detail, however, here from the starting point all the roads, which can be taken by a vehicle, are indicated in bold lines, and the end of the bolder sections are indicated with circles, which as a result shows the actual range on the given route. Our task in this case is to determine and indicate on the map the actual range points and the associated routes.

Figure 3:
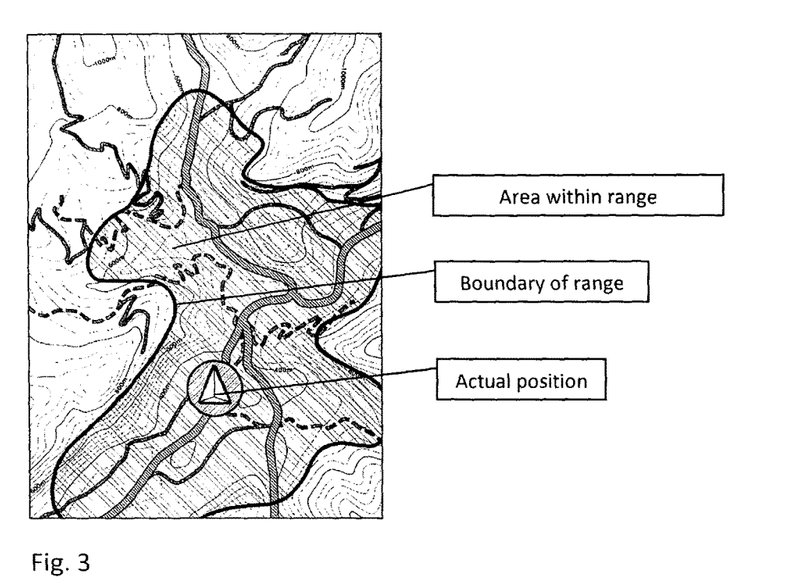
FIG. 3 shows a map similar to the one indicated in FIG. 1, which shows the borderlines of the actual range and the area included therein.

FIG. 3 shows the same map detail, indicating an area with thin lines, the border of which is marked with dashed lines. Such border line indicates the actual ranges calculated from the starting point in cases in which the vehicle can go to any directions and it does not have to take into consideration any of the built or assigned roads. This issue may come up in connection with mountain bikes or other cross-country vehicles which can be freely used off-road.

Figure 4:
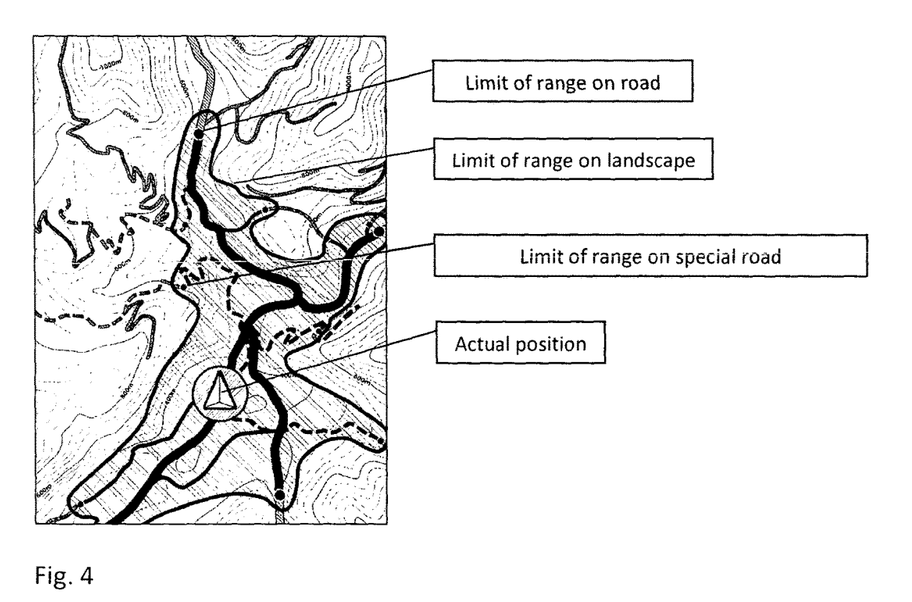
FIG. 4 shows—the combination of FIGS. 2 and 3, in which the border points of the roads and the contours of the range are indicated.

FIG. 4 is in fact the combination of FIGS. 2 and 3, which indicates the actual range with respect to the built and assigned roads as well as off-road. Such a map is necessary if the vehicle can be used both on built roads and off-road.

The way for determining the actual range will first be introduced considering the built and assigned roads (together: roads). The map database includes the coordinates of the roads, namely, the peak points related to the particular roads. Peak points mean such points of the roads at which certain parameters typical of the roads change. Such parameter typically is the changing of the steepness of the road and when two roads meet. The method is carried out based on the Dijkstra algorithm, which works with graphs. Here the peak points of the graphs mean the mentioned peak points and the edges of the graphs mean the road sections connecting the peak points. The cost associated with an edge means the corrected distance necessary for covering the given edge, i.e., the consumption necessary for covering the given distance, for example, in ampere hour units. The "corrected distance" means the weighted value of the above described distance Mt for the steepness of the given edge. We know these numbers for the given vehicle and these numbers are available in a form of a chart. Going up on a hill the consumption increases, therefore, a given road taken on a steep uphill, depending on the extent of the steepness, corresponds to a consumption of a longer horizontal road. The "cost" of the given edge means the equivalent consumption necessary for covering the horizontal road weighted by the steepness of that edge. If we are driving a regenerative vehicle down on a slope—the correction factor is lower than 1.

Figure 5A:
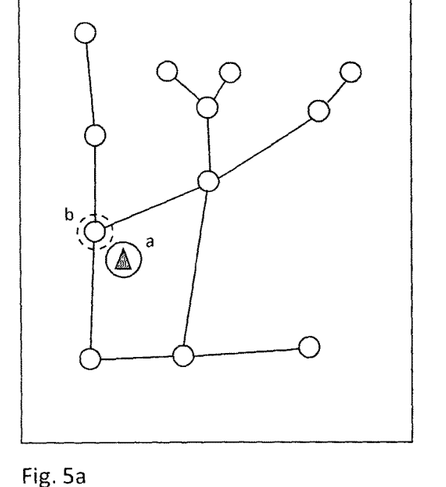
Figure 5B:
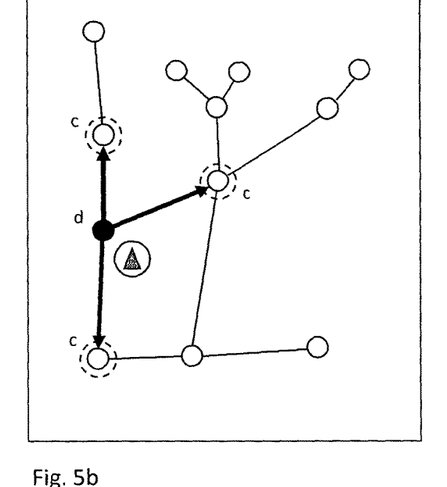
Figure 5C:
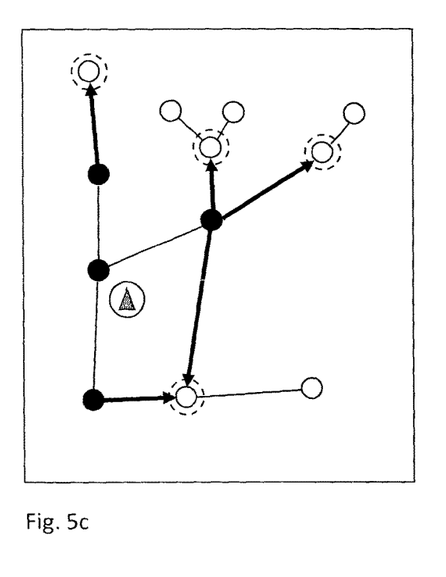
Figure 5D:
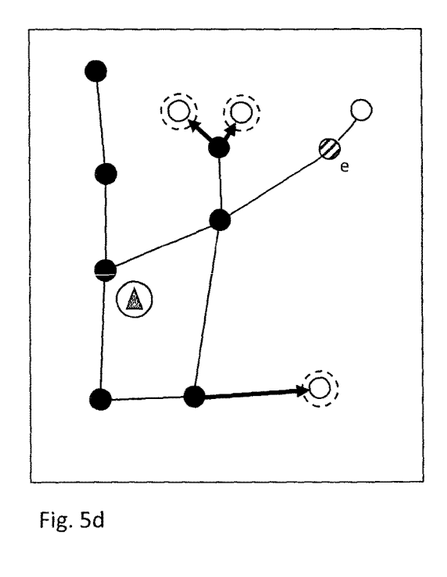
Figure 6:
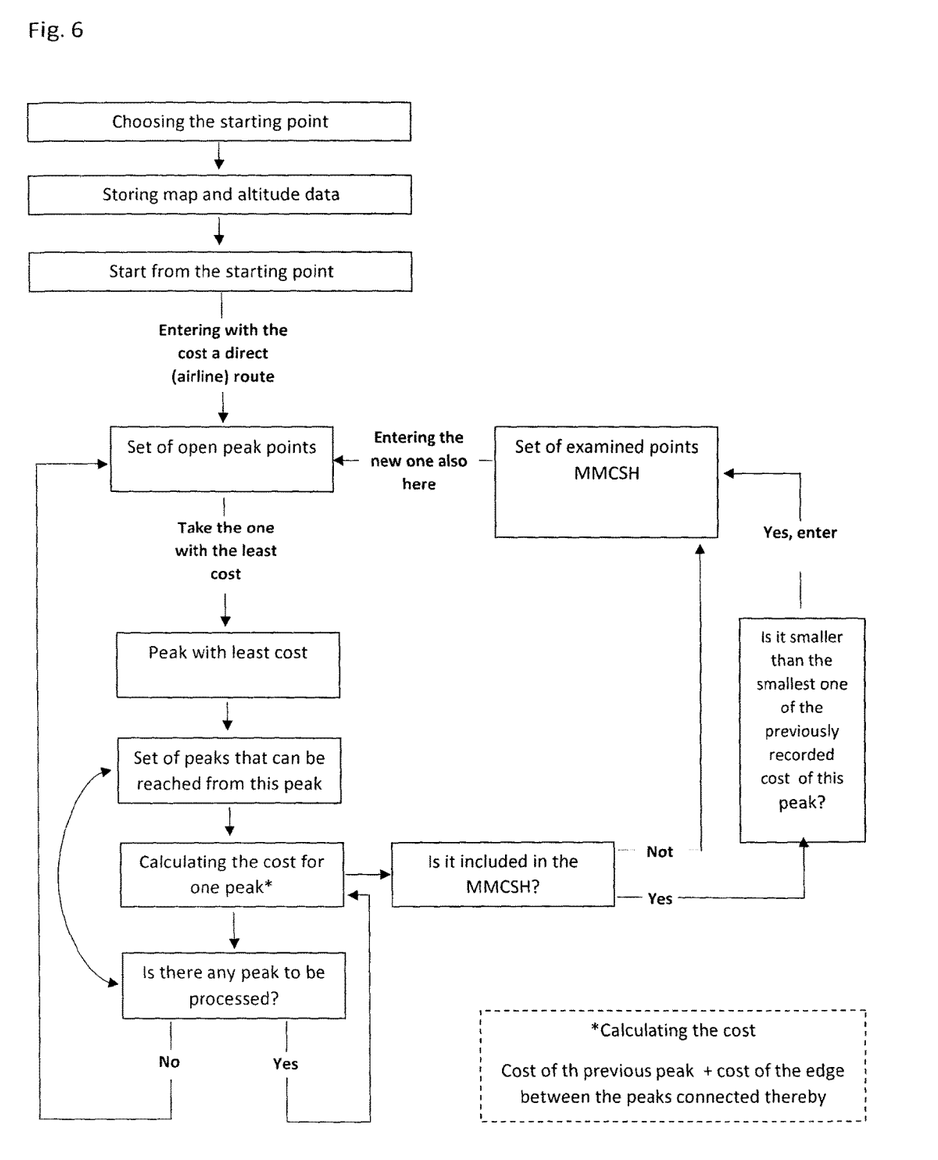
FIG. 6 shows the flow chart of the method according to the invention.

The various steps of the method are introduced in the phase diagrams included in FIGS. 5a-5d and the flow chart shown in FIG. 6. FIG. 5a indicates a partial surface with optional routes for the vehicle. On the roads we have indicated with empty circles each peak point, which are typical of the road. The starting point is indicated with a circled triangle, which is indicated as point a. Peak point b, which is located closest to point a, is indicated with a dashed-lined circle.

As a first step of the process, in accordance with the flow chart of FIG. 6, we input the data of the starting point into the processor making the calculation; and from the map data and surface data we read the data of peak point b which is located the closest to the starting point. The peak points which have been read but are subject to being processed are called "open peak points", such peak points constitute a special set, which should be subject to the actions described below.

In the case set forth in FIG. 5a, the only open peak point is peak point b. We apply to this peak point only the cost of the horizontal distance between peak points a and b. As a result, the given peak point becomes an "examined peak point" and we input the data of the peak point together with the associated cost into a temporary storage space, which is called as "the set of the examined peak points". This one examined peak point also qualifies as the peak point with the lowest cost.

According to the flow chart shown in FIG. 6, the next step is to determine what other peak points can be accessed directly from this peak point, i.e., we create the "set of the accessible peak points". The edges connected to these peak points are indicated in a bold black line in FIG. 5b and the peak points belonging to them are indicated with a dashed circle. These are peak points c. It is important to note that only these accessible peak points are entered into the map database in the course of this step, i.e., the capacity of the processor should be used for only a fragment of all of the available peak points.

Then we calculate the costs associated with these peak points. The cost amounts to the aggregate of the cost belonging to the starting point and the cost calculated with respect to the edge belonging to a given peak point. We complete the calculations with respect to each of such peak points and we enter the data into a storage space of the "set of the examined peak points". The question whether the given peak point indicated in the storage space for the set of the examined peak points, will become more relevant afterwards, due to the fact that if such peak point has already been included therein, then the same peak point cannot be put into such storage space for the second time, unless we can get there with a cost lower then indicated earlier. The first examination completes with this storing exercise.

In the next examination cycle, from the map database we feed into those open peak points which are accessible from the examined and stored peak points. This second cycle is shown in FIG. 5, where the examined peak points are indicated in a black circle instead of an empty circle and the next peak points directly accessible therefrom (which are still open peak points) are indicated with empty dashed circles. In this case, (FIG. 5c) the subject matter of this examination cycle are five new edges and the peak points at the ends of such edges. We calculate the cost associated with each edge and we feed the data of the peak point related to the edge into the storage space including the "set of the examined peak points". However, in the case of FIG. 5c, there are two edges leading to the same peak point. As the various edges have various associated costs, we only feed into the edge with the lowest cost with respect to a given peak point. For example, if we have already input the data with a higher cost with respect to a peak point, and in the course of the next examination it turns out that a lower cost can be associated with the same peak point in another direction, then in the storage space, we replace the cost associated with the peak point with the lower cost, and vice versa, we do not enter into the storage the higher cost of the same peak point.

With respect to the entered costs, we examine whether its value is lower than the preset cost associated with the actual range. If so, then we allow the examination of further open peak points accessible from the given peak point and if such cost is higher, then we consider the previous peak point as the peak point representing the real range.

In the next cycle, we enter into the processor such peak point data, which are directly accessible from the peak points just examined and we repeat the examination of such peak points. FIG. 5d shows such next step, where the edges subject to examination are indicated with bold lines and the related peak points subject to examination are indicated with dashed circles. However, it is apparent that one of the directly accessible neighboring peak points is indicated with diagonal lines. This peak point e has already reached the allowable maximum cost, therefore, with respect to this peak point we do not examine further edges starting therefrom. We consider peak point e as the point indicating the actual range with respect to a given road, which we indicate along the given road on the map. The "border of the range" points indicated in FIG. 2 are exactly such points.

The above specified steps are to be repeated until there is an edge from the examined peak points which leads to one of the open peak points. When we have already reached the maximum range taking any of the available routes, then we display it on each available route and the task can be considered to be completed successfully.

We note that we conduct the examination with an iteration method systematically and in one cycle we limit it to only the peak points from the large number of possible peak points, which directly lead to the examined peak points, i.e., the neighboring peak points of such examined peak points. As a result, the processing requires a smaller storage space and processor capacity than it would require otherwise.

The above specified method enables us to determine the actual range along the roads, when we know the peak points and the edges along the roads. If the vehicle is capable to run off-road, and it does not require built or assigned roads, the exercise can be completed with a "net" approach. Net means any regular shape, by which the given area can be covered, and wherein the coordinates, including the altitude data of the peak points of all of the nets are known. We use a net of squares when conducting the most commonly used net method. The size of the squares determines the accuracy of the examination. The smaller squares we use the more accurate our determination will be. However, when reducing the size of the net, the storage and processing requirement increases by a quadratic function. The appropriate number is determined by taking into consideration together the features of the vehicle, the required accuracy and the processing capacity of the available device. According to experience, a net between the size of 30-80 meters provides appropriate accuracy.

Figure 7:
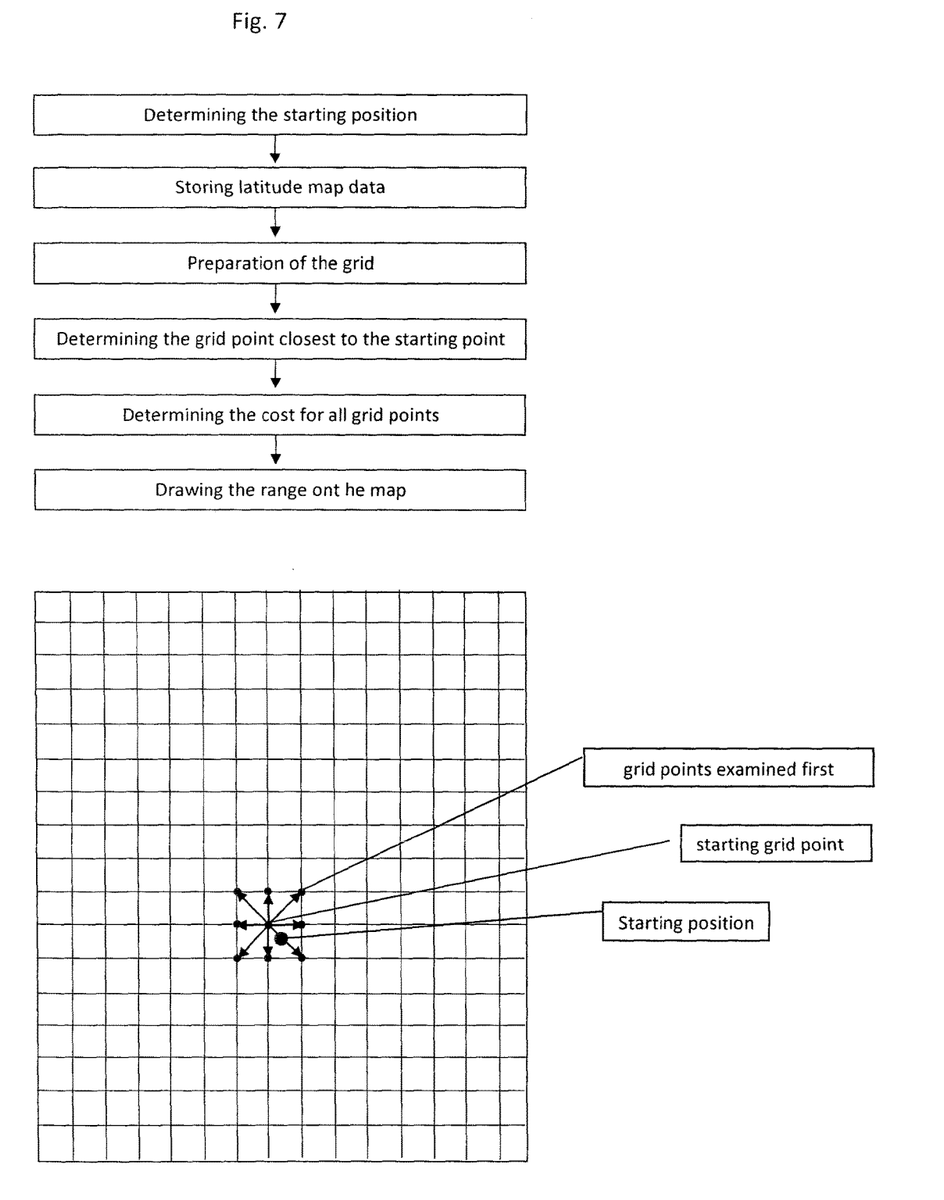
FIG. 7 shows the flow chart for a method related to an off-road surface without a road system.

FIG. 7 is a combined flow chart which indicates the principles of the net procedure. In comparison to the previous procedure, here the peak points are the peak points of the net and the edges are the lines connecting the starting point and the neighboring (directly accessible) peak points. Here, the starting point should be fit into one of the center peak points of the net, to which zero cost is associated, and we shall follow the steps specified in the previous example. The "directly accessible" peak points may mean on the net from a given peak point any of the peak points of its neighboring square.

Obviously, we hereby presume the availability of the database related to the peak points of the net and that the parameters necessary for determining the range has been provided. In this case, the application of the Dijkstra algorithm for the net means the indication of the surrounding area of the starting point of the range, i.e., from the starting point any parts of the areas with diagonal lines can be accessible considering the given circumstances of the given vehicle.

Figure 8:
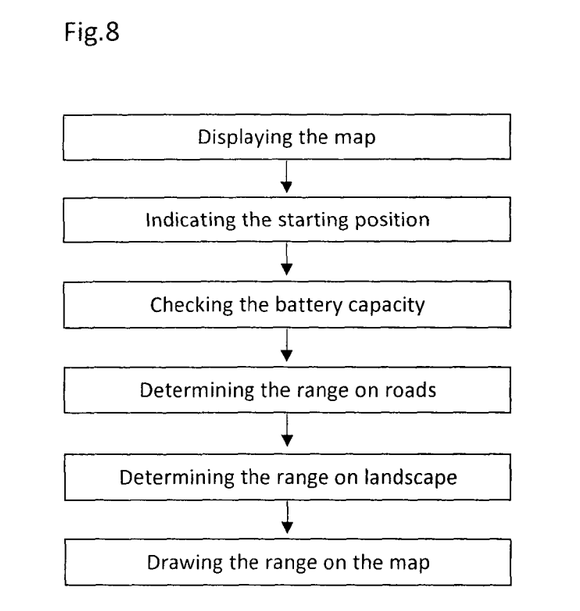
FIG. 8 is a flow chart for examining the surface together with the road system.

Finally, the flow chart shown in FIG. 8 indicates the actual range with respect to the road system and the off-road real range with respect to the given landscape. Now, we have to conduct both of the previously mentioned examinations, as a result of which we receive the map shown in FIG. 4. On such picture the actual range is indicated with respect to the roads, and the area with diagonal lines indicates the borders of the off-road surface. We determine the accessible landscape points by, in advance, putting into the "set of the open peak points" the landscape bar points, as reference points, located close by or right on the examined and available roads, with respective costs that are necessary for getting to such points. Following that, we apply the Dijkstra algorithm to such points and then we display the available points obtained through this exercise.

As a result of the method, we receive a number of actual range points, which provide assistance with planning excursions or routes and choosing a route.

A significant advantage of the method is that it can be fully completed with an intelligent mobile device. Thus, there is no need for a separate server and appropriate Internet connection. Through a separate application the software necessary for conducting the method can be downloaded on the device and run on such device anywhere, provided that the required landscape and map data have already been downloaded in advance to the memory of the device. Certainly, this can also work with a separately dedicated mobile device with a program necessary for conducting the method.

The invention claimed is:

1. Method for determining the actual range that can be taken by a vehicle with electric drive counted from a starting point, and displaying the actual range on a map; comprising storing first in a non-volatile database predetermined data of the vehicle that have influence on the energy consumption thereof including the load of the vehicle, storing in the non-volatile database the maximum energy allowed to be used by the vehicle till the range is reached, also storing map data of an area around said starting point in said non-volatile memory wherein said area is expected to be at least as large as the range to be determined, the map data including coordinate and altitude data, stored in said non-volatile memory, as well as route data, stored in said non-volatile memory, if built routes exist in the area; and a non-volatile program memory storing a computer program for calculating the expected energy consumption of the vehicle based on said stored data along different routes extending in said area and including or being close to the starting point, and defining boundary points of the actual range in which the calculated energy consumption is at most equal to said allowed energy consumption; and displaying on a human readable display the so obtained boundary points of the actual range on the map, wherein a central processing unit is responsive to said non-volatile program memory to execute said computer program to calculate and store during said storing step the average electrical consumption of the vehicle associated with taking a unity distance along a horizontal road section; and also to store by what coefficients the actual consumption differs on road sections with differing steepness from the consumption measured along a horizontal road of the same length, and said map data include data of artificially generated virtual routes if the vehicle can move off road; and during said calculating step said central processing unit dividing all routes in said area into a plurality of edge sections with respective constant steepness, each edge section is defined between respective pairs of peak points, wherein all route junctions represent a respective peak point; and in said calculating step edge costs are calculated by multiplying the stored unity energy consumption with the length of the edge and with the stored coefficient associated with the steepness of the edge, then beginning from said starting point determining the cost of any possible route by using a successive iteration and the Dijkstra algorithm, wherein the cost of a peak point is the sum of the cost of the edge section leading directly to that peak point and the cost of the peak point at the other end of the edge section, wherein if a peak point can be accessed through different routes, the cost of the peak point is the smallest one out of the costs calculated for the same peak point, and the boundary point along each of said routes is the peak point that have a calculated cost at most equal to said stored allowed energy consumption.

2. The method as claimed in claim 1, wherein during said calculation step the cost calculated for a peak point is stored in a temporary database referred to as the set of examined peaks; and if in a later iterative cycle the cost of a previously examined peak is determined again and this is smaller than the value already stored for that peak the cost of the same peak is replaced in the temporary database with this smaller cost, and in the calculation of the costs of the edges starting at an examined peak point the stored cost will be added to the cost calculated for this starting edge.

3. The method as claimed in claim 1 or claim 2, wherein the vehicle can move along a land without built roads, comprising the steps of covering said area on the map by a virtual net of regular shapes that comprise corners points and sides of predetermined length connecting the corner points, and the net includes said starting point, wherein the corner points represent said peak points on the map, and the sides represent said edge sections of a virtual route system.

4. The method as claimed in any one of claim 1, and 2, wherein the boundary points are interconnected and the so obtained closed configuration is shown on the map.

5. The method as claimed in claim 1 or 2, wherein the area comprises built routes, and the associated boundary points and the built routes are displayed in a distinctive way from the way how the boundary line for non-built routes is shown.

6. Method for displaying the actual range of a vehicle with electric drive on a map counted from a starting point, comprising the steps of determining the electrical consumption associated with taking a unity distance along a horizontal road section based on predetermined parameters of the vehicle; and storing the maximum consumption that defines the actual range, characterized by the steps of storing in a database by what coefficients the actual consumption differs on road sections with differing steepness from the consumption measured along a horizontal road of the same length; storing map data corresponding to an estimated range around the starting point; assigning a plurality of discrete peak points on the map around the starting point, wherein the steepness of the landscape is constant between two neighboring peaks; then beginning from said starting point determining the cost of any possible route by using a successive iteration and the Dijkstra algorithm, wherein the cost along a road section between two neighboring peaks is given by the consumption measured on a horizontal road with the same length as modified by the coefficient corresponding to the steepness of said road section; then storing the peak points where the value of the associated cost reaches said maximum consumption as points of the actual range, and displaying these points on the map.

7. The method as claimed in claim 6, wherein during the repeated examinations storing the coordinate data and the associated cost in a temporary database referred to as the set of examined peaks; and in the subsequent cycle examining the previously non-examined peak points which are ends of edges starting from the examined peak points and determining the costs associated with these peak points; and if a peak is associated with different costs, then storing the smallest one of such costs in said temporary database of the set of examined peaks.

8. The method as claimed in claim 6, wherein the cost associated with a peak point is the sum of the modified cost of the edge ending at said peak point and of the cost of the peak point where said edge starts.

9. The method as claimed in claim 7, wherein for the processing of the respective cycles only the data of the peak points obtained at the end of the immediately previous cycle and of those peak points which are located at the ends of the edges starting from said previous peak points are read from the map database and used.

10. The method as claimed in claim 6, wherein the peak points and the edges are characteristic parts of the roads that can be taken by the vehicle and being on said map.

11. The method as claimed in claim 6, wherein the vehicle can move along a land without built roads, and said peak points and edges are represented by corners and edges of a net that includes said starting point and has edges of predetermined length, and the cost of the peak points of the net are determined beginning from said starting point, and when such a cost reaches the maximum consumption, then the associated peak is indicated on the map as a boundary point.

12. The method as in claim 11, wherein the boundary points are interconnected in a closed configuration, and said closed configuration is shown on the map.

13. The method as claimed in claim 12, wherein if on the given land there are also roads that can be driven by vehicles, then within said configuration said roads and their associated range points are also indicated on the map.

14. The method as claimed in claim 6, wherein the vehicle can move on land without built roads.

15. The method as claimed in claim 6 or 13, wherein the routes than can be reached and are within the actual range are show in a distinctive way.

* * * * *